United States Patent [19]
Turner

[11] 3,802,756
[45] Apr. 9, 1974

[54] FILAMENT WOUND BEARING

[75] Inventor: Peter H. Turner, Burbank, Calif.

[73] Assignee: Sargent Industries, Inc., Los Angeles, Calif.

[22] Filed: July 24, 1972

[21] Appl. No.: 274,605

[52] U.S. Cl. ............................................. 308/238
[51] Int. Cl. ............................................. F16c 33/20
[58] Field of Search ....... 308/238, DIG. 7; 156/172, 156/173

[56] References Cited
UNITED STATES PATENTS

| | | | |
|---|---|---|---|
| 3,053,592 | 9/1962 | Runton et al. | 308/238 |
| 2,995,462 | 8/1961 | Mitchell et al. | 308/238 |
| 2,958,927 | 11/1960 | Kravats | 308/238 |
| 3,030,248 | 4/1962 | Runton | 308/238 |
| 3,110,530 | 11/1963 | Herman | 308/238 |
| 3,458,223 | 7/1969 | White | 308/238 |
| 3,594,049 | 7/1971 | Turner | 308/238 |
| 3,697,346 | 10/1972 | Van Dorn et al. | 308/238 |

Primary Examiner—Charles J. Myhre
Assistant Examiner—Barry Grossman
Attorney, Agent, or Firm—Smyth, Roston & Pavitt

[57] ABSTRACT

In a process for constructing a bearing ball, a pair of spaced forms are mounted on a rotatable shaft to define the inner and lateral surfaces of the ball. A filament is coated with a curable adhesive and wound between the forms on the shaft to form a winding having an outer configuration similar to that desired for the ball. The winding is cured to harden the adhesive and the outer surface is shaped to provide a smooth bearing surface. The outer surface of the ball can be metallized in a vacuum chamber to increase the wear resistance of the bearing.

A bearing race can be similarly constructed by winding the coated filament onto a ball so that the inner surface of the race is substantially the shape of the outer surface of the bearing ball. A low friction powder can be added to the adhesive to lower the coefficient of friction of the race.

The resulting bearing balls and races are light and highly resilient, and they offer considerable resistance to the propagation of cracks.

17 Claims, 7 Drawing Figures

PATENTED APR 9 1974 3,802,756

FILAMENT WOUND BEARING

BACKGROUND OF THE INVENTION

1. Field of the Invention

This invention relates to a method for making filament wound bearing balls and bearing races and to products made by practicing the method.

2. Description of the Prior Art

Bearing balls and bearing races are typically used to provide support for rotatable shafts. In some cases, a bearing ball is fixed to the shaft so that the axis of the shaft passes through the center of the ball. This type of bearing typically is defined by an outer surface which is arcuate in an axial direction and which is registerable with the inner surface of an associated bearing race to maintain the axial alignment of the shaft.

As the shaft rotates, the ball turns within the bearing race so that considerable friction forces are developed. The friction forces tend to generate heat and also tend to wear the outer surface of the ball and the inner surface of the race, hereinafter referred to as the wearing surfaces. The degeneration of the wearing surfaces creates tolerances therebetween which permit the shaft to wobble, and the wobbling of the shaft creates additional forces on the wearing surfaces so that the support of the shaft ultimately fails.

Prior attempts to minimize the friction forces have included forming the bearings and races of hardened metals. Though this has not substantially decreased the friction forces, the hardened metals have offered substantial resistance to the degenerative effects of the friction forces. The metal bearing balls and races have been undesirably heavy however, so that the magnitudes of the additional forces created by the wobbling shaft have been particularly high.

Bearing liners having relatively low coefficients of friction have been bonded to the inner surface of the bearing races to lower the friction forces. Bonding methods and materials have not been entirely satisfactory however, and misalignment and uneven wear of the bearing components have resulted.

A particular disadvantage of the metal balls and bearing races has resulted from their reaction to minor fractures. Even minor cracks which have developed in the metal balls and races have soon resulted in major fractures. This apparently is due to the fact that homogeneous metals offer little resistance to the propagation of a crack. This has been particularly apparent in war zones where bullets and shrapnel creating even slight creases in the balls and races have necessitated the immediate replacement of the damaged part. Whereas, minor cracks might result in the immediate replacement of a damaged part in civilian applications, a cracked ball or race might still be functional in a war zone if there were some resistance to the propagation of the crack. To compound the problem, the characteristics which make a bearing component crack resistant tend to make it unacceptable for bearing manufacture by conventional forming techniques.

SUMMARY OF THE INVENTION

The present invention provides for the construction of filament wound bearing balls and races which have weight and resiliency characteristics superior to those of the metal bearings. The filament wound balls and races are also highly resistant to the propagation of minor cracks and creases.

To form a filament wound bearing ball, two forms can be mounted on a shaft and spaced to define the desired width of the ball. A filament of high tensile strength such as dacron thread can be coated with a bonding agent and wound between the forms to define the outer surface of the ball. The bonding agent can be a thermal setting two-stage epoxy adhesive which is capable of being hardened by heating to a relatively high temperature. This curing provides a very hard surface and gives the filament wound ball resiliency characteristics superior to those of the metal balls. This is accomplished without increasing the weight of the ball; in fact, the filament wound balls have a density substantially less than that of the metal balls.

The filament can be threaded through a level winder having characteristics for being programmed to wind a greater amount of the thread in the area of the ball where the largest diameter is desired. For example, more of the thread can be wound in the center of the wrapped area to provide the outer surface of the ball with a generally spherical configuration. After the ball is cured, the outer surface of the ball can be machined to provide a generally smooth outer surface.

A vacuum metallized coating of bearing metal can be applied to the wound ball to enhance its life characteristics. This can be accomplished by placing the machined ball in a vacuum chamber with a bearing metal. As the metal is heated to form a metal vapor, the ball can be cooled so that the metal vapor condenses on the ball providing a thin metallic coating.

A bearing outer race can be formed in a similar manner except that the form upon which it is wound will typically be a ball. Side forms can be mounted on the shaft to define the desired width of the bearing race. The initial portions of the filament which form the inner surface of the race can be coated with a mixture of an adhesive and a powder having a low coefficient of friction. In this manner a low friction layer can be formed on the inner surface of the bearing race. Beyond this layer the low friction powder can be eliminated from the adhesive. It will be noted that the low friction layer provides the advantages associated with the bearing liners in the prior art, without incorporating the typical alignment and bonding problems.

A filament wound bearing race can be constructed on a filament wound ball if a mold release agent is applied to the surface of the ball, and if the cure temperature of the race adhesive is lower than the cure temperature of the ball adhesive. It will be noted that by wrapping the bearing race about the ball upon which it will be ultimately disposed, the interior surface of the race achieves its desired configuration without the requirement of elaborate machining.

The filament wound balls and races are exceptionally light and tough and are highly resistant to the propagation of cracks which may develop therein. Their lighter weight is accounted for by the low density of the adhesive and filament relative to the density of the present metal bearings. The significant resistance of the filament wound balls and races to propagation of cracks is associated with the high tensile strength of the filament which is circumferentially disposed around the associated ball or race.

DESCRIPTION OF PREFERRED EMBODIMENTS

Figure 1:
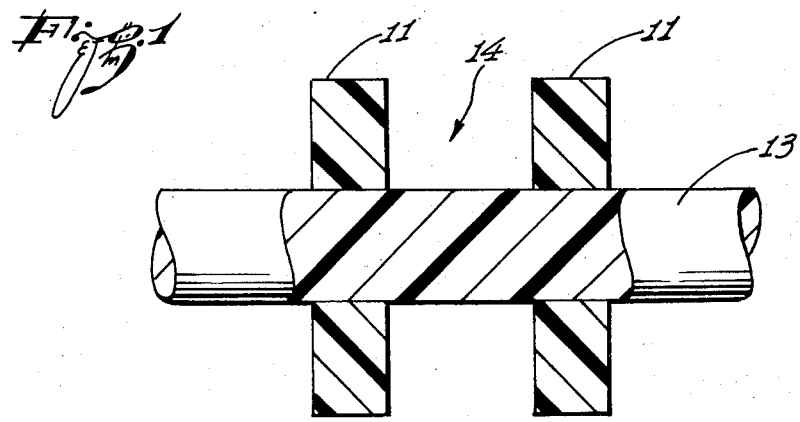
FIG. 1 is a side elevational view of a shaft with forms spatially mounted thereon prior to the winding of a bearing ball on the shaft and between the forms.
Figure 2:
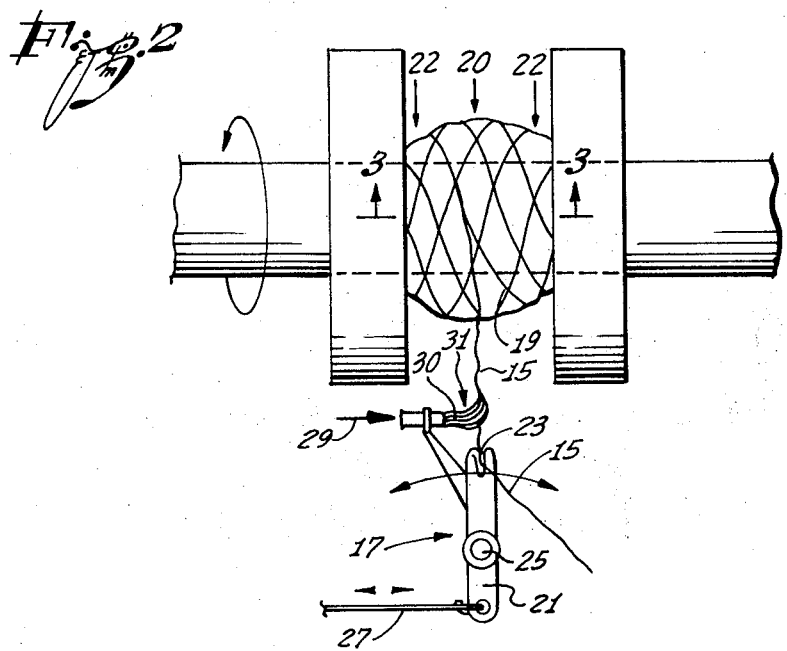
FIG. 2 is a front elevational view of apparatus for coating a filament and winding the filament on a shaft.

The initial step of a process for forming a filament wound bearing ball is illustrated in FIG. 1 wherein a pair of forms 11 are mounted on a shaft 13. In combination, the forms 11 and the shaft 13 define a region 14 within which a ball can be formed. The forms 11 have walls which are preferably disposed perpendicular to the shaft 13 and spaced from each other a distance equal to the desired width of the ball. The diameter of the shaft 13 is substantially equal to the desired inner diameter of the ball. Thus, the forms 11 and the shaft 13 define the width and the inner diameter of the ball. The shaft 13 and the forms 11 can be constructed of a material such as polytetrafluoroethylene having a low coefficient of friction.

A filament or yarn 15 having a high tensile strength can be wound upon the shaft 13 to form a winding 19. Synthetic filaments such as nylon or rayon may be used but a dacron filament is preferred. All of these materials have characteristics of being used in fabrics but other types of filaments may also be used.

A level winder 17 provides a means for providing the ball with a desired surface configuration. The level winder 17 can consist of a lever 21 having a slot 23 in one end thereof through which the filament 15 is threaded. In the preferred embodiment, the lever 21 is pivotally mounted upon a fulcrum 25 which is disposed between the ends of the lever 21 and equidistant from the forms 11. In order that the filament 15 can be wound in proximity to the forms 11, the distance between the slot 23 and the fulcrum 25 is preferably greater than one-half the distance between the forms 11. In this manner the lever 21 can be pivoted on the fulcrum 25 as the shaft turns relative to the level winder 17, whereby the filament 15 is wound between the forms 11.

In the preferred embodiment, a means for pivoting the level winder 17 includes an actuating rod 27 pivotally connected to the end of the lever 21 opposite to that of the slot 23. The actuating rod 27 can be biased to ride on the surface of a cam (not shown) so that the pivoting of the lever 21 about the fulcrum 25 is dependent upon the configuration of the cam.

In the preferred embodiment, the winding 19 has a central region 20 and a lateral regions 22 on either side thereof. In this embodiment the cam (not shown) moves the actuating rod so that the surface of the winding 19 has a substantially spherical configuration. In other words, the slot 23 spends more time in proximity to the central region 20 than the lateral regions 22 so that the central region 20 contains more windings of the filament 15 than the lateral regions 22.

An adhesive, shown generally at 31, can be applied to the filament 15 to hold it in position on the winding 19. The application is preferably made after the filament 15 passes through the slot 23 and before the filament 15 is wound upon the winding 19. The adhesive 31 can be applied by a coater 29 having a brush 30 in the end thereof. In the preferred embodiment, the coater 29 is mounted on the level winder 17 so that the filament 15 passes through the brush 30 in transit to the winding 19.

The adhesive can be a phenolic base, thermal setting, two-stage adhesive which is curable to form a strong chemical bond. Adhesives such as Rabond R-84015, produced by Raybestos-Manhattan, and Resiweld No. R-7119, produced by H. B. Fuller Corp., are particularly suitable. Both of these adhesives can be hardened by heating to a temperature of approximately 212°F and can be cured by heating to a temperature of approximately 300°F. The adhesives can be heated to become hardened after the winding operation. the curing of the adhesive forms a strong chemical bond which is primarily responsible for the high resiliency of the filament wound bearing.

In an alternate construction of the winding 19, boron is included in the filament 15 and molten aluminum is included in the adhesive 31. The boron filament 15 is very strong in tension and the molten aluminum provides an excellent bonding agent for the boron filament.

Figure 3:
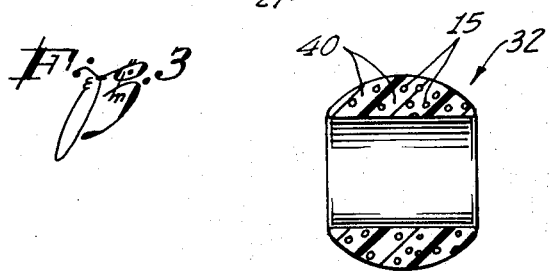
FIG. 3 is a cross-sectional view of a filament wound ball taken on line 3 — 3 of FIG. 2.

After the winding 19 has substantially achieved the desired surface configuration, the entire assembly including the shaft 13 and the forms 11 can be oven cured. Then the forms 11 and the shaft 13 can be cooled and the outer surface of the winding 19, which is typically rough, can be machined or ground to form a ball such as that shown generally at 32. The ball 32 is shown in cross section in FIG. 3 wherein the bonding agent 31 is disposed in the interstices 40 between the adjacent windings of the filament 15.

Thus a filament wound ball can be constructed to provide weight and resiliency characteristics superior to the metal balls of the prior art. Minor cracks which might occur at the outer surface of the ball 32 will not propagate to the interior regions of the ball 32 since such propagation would be associated with the breaking of the windings of the filament 15. If the filament 15 is chosen for its high tensile strength, the breaking of these filaments is highly unlikely.

Figure 4:
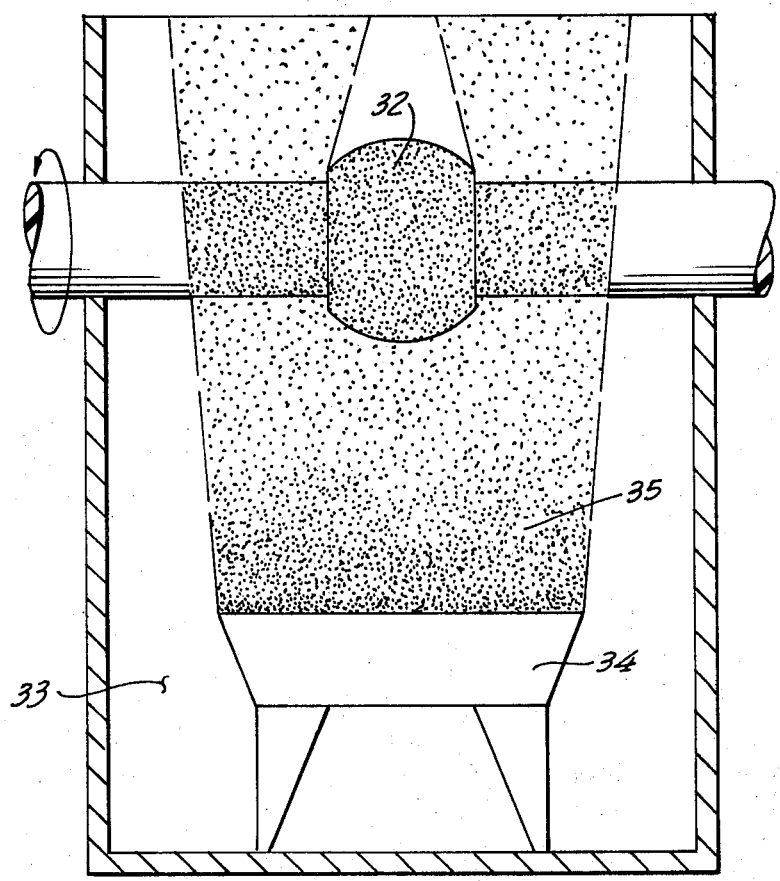
FIG. 4 is a front elevational view of apparatus for coating the filament wound ball with bearing metal.
Figure 5:
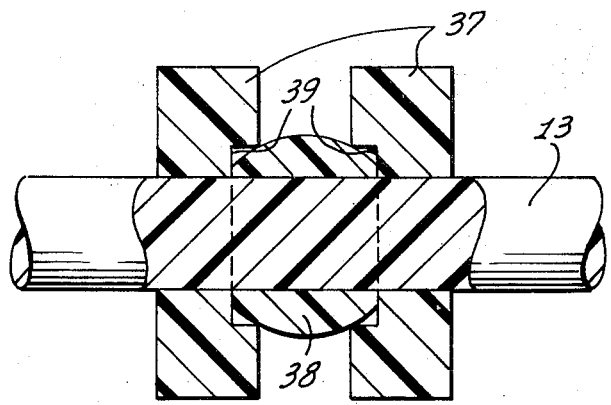
FIG. 5 is a side elevational view of a shaft, a ball mounted thereon, and forms mounted on either side of the ball.
Figure 6:
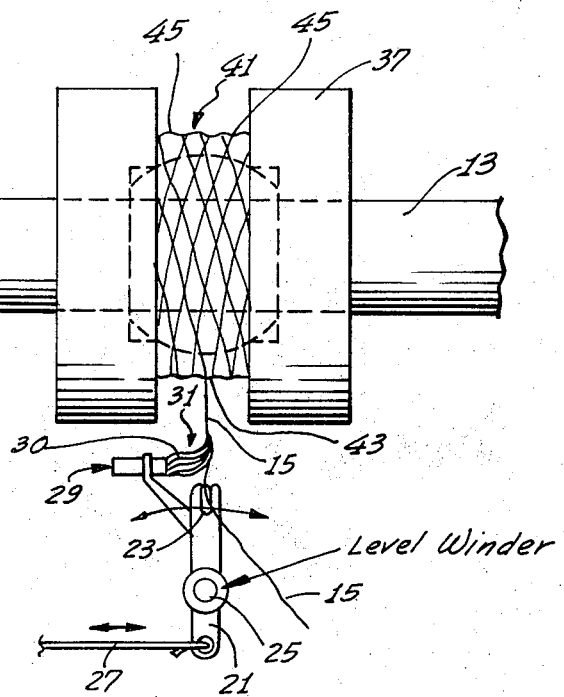
FIG. 6 is a front elevational view of apparatus for coating a filament and winding the filament upon a ball.

The useful life of the ball 32 can be enhanced by providing the surface of the winding 19 with a thin metallic coating. This can be accomplished by placing the shaft 13 and the bearing 32 in a vacuum chamber 33 with a metal holder 34 (FIG. 4). The air can be withdrawn from the vacuum chamber 33 and the metal in the holder 34 heated to its boiling point so that a metal vapor 35 is formed. The filament wound ball 32 can be cooled so that the metal vapor 35 condenses on the cooler bearing 32 to provide a ball 32 with a thin metallic coating.

Figure 7:
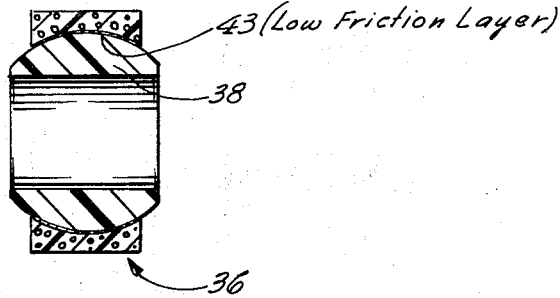
FIG. 7 is a cross-sectional view of a ball and a race wound thereon taken on line 7 — 7 of FIG. 6.

A bearing race, shown generally at 36 in FIG. 7, can be formed in much the same manner as the ball 32. The initial step of the process comprises mounting a ball 38, such as the filament wound ball 32 (FIG. 4), on the shaft 13 and mounting a pair of forms 37 on either side of the ball 38. In the preferred embodiment the forms 37 are similar to the forms 11 except they are provided with recesses 39 which permit the forms 37 to extend partially over the outer surface of the ball 38. In this manner the inner surface of the race 36 is defined by the outer surface of the ball 38 and the width of the race 36 is defined by the forms 37. If the forms 37 are provided with the recesses 39, the width of the race will be less than the width of the ball 38.

As previously described the filament 15 can be threaded through the slot 23 in the level winder 17 and onto the ball 38. As the shaft 13 is turned relative to the slot 23, the filament 15 is drawn onto the ball 38 to form a winding shown generally at 41. The winding 41 comprises a central region 43 and lateral regions 45 disposed on either side thereof. As previously described, the angle of pivot of the level winder 17, which is dictated by the position of the actuating rod 27, determines the point at which the filament 15 strikes the winding 41.

If the interior surface of the race 36 is substantially spherical and the desired outer configuration of the race is cylindrical, it is apparent that more of the filament 15 would have to be wound at the lateral regions 45 than at the central regions 43 of the winding 41. Under such circumstances, the lever 21 is preferably actuated by the actuating rod 27 so that the slot 23 is disposed over the lateral regions 45 a greater period of time than over the central region 43.

As noted, the ball 38 can comprise the filament wound ball 32 so that both the ball 32 and its race 36 have the improved characteristics of the filament wound bearing components. In such a process, a suitable mold release agent such as MIL-L-60326 can be applied to the ball 32 prior to the winding of the coated filament thereon. Also, the curable adhesive of the race should be chosen so that it cures at a lower temperature than the cure temperature of the adhesive used to form the ball 32.

The adhesive 31 can be applied to the filament 15 in a manner similar to that previously described. In the bearing race 36, however, a low friction layer 43 (best shown in FIG. 7) is preferably disposed at least along the inner surface of the race 36. The low friction layer 43 has characteristics including a low coefficient of friction so that the friction forces created by the associated bearing are substantially reduced. In addition, the amount of heat generated between the wearing surfaces is considerably decreased.

The low friction layer 43 can be formed by adding to the adhesive 31 a substance having characteristics including a low coefficient of friction. As the filament 15 passes through the slot 23, the adhesive 31 and the low friction substance is applied to the filament 15 by the brush 30. In this manner the low friction substance is incorporated into the race 36 by the process of winding the coated filament 15 to form the winding 41.

The low friction substance can be polytetrafluoroethylene powder such as the five micron polytetrafluoroethylene pure powder manufactured by DuPont. In the preferred embodiment this powder comprises between 20 percent and 35 percent of the weight of the low friction layer 43. The adhesive used in the low friction layer 43 can be the same as that used in other regions of the race 37. The low friction layer 43 can extend through the entire race 37, but preferably it is limited to a thickness of 0.010–0.012 inches on the inner surface of the race 37.

The general advantages of a low friction layer 43 have already been discussed, but certain specific advantages are of particular importance. It will be noted that the filament 15 is a continuous filament which passes from the low friction layer 43 into the remaining regions of the race 36. Since the adhesive 31 and the filament 15 are preferably the same throughout the race 36, it can be seen that the low friction layer 43 is substantially integral with the remainder of the race 36 and differs therefrom only by the inclusion of the low friction powder. Thus a much stronger bond is created between the low friction layer 43 and the remainder of the race 36 than was previously possible with the bearing liners of the prior art. This greatly increases the strength of the race 36 and significantly extends the period of its useful life.

After the winding 41 has been wound, it can be removed to an oven for curing. This will harden the adhesive 31 and impart the high strength characteristics which are associated with the filament wound races. Once the adhesive 31 has been cured, the race 36 can be shaped by machining the inner surface of the winding 41 to the desired configuration.

It will be noted that the low friction layer 43 is automatically developed within the race 36 by the mere addition of a powder to the adhesive 31. No separate process is required to manufacture a bearing liner which would then require alignment and adhesion to the race 36. It will also be noted that the formation of the low friction layer 43 within the winding 41 permits a greater control over the size and shape of the interior surface of the race 36. In the filament wound race 36, the size of the ball 32 can dictate the shape of the interior surface of the race 36 so that no allowance need be made for a bearing liner.

A significant advantage of the filament wound balls and races is particularly apparent in areas where bearings are susceptible to abuse. One such area might be a war zone where bearings are typically subjected to bullets and other forms of shrapnel which can create cracks and crevices in the balls and races.

It has been found that even minor cracks tend to propagate within the present metal bearings. This can be explained by the fact that the greatest stresses around a crack are at the apex of the crack. This being the case, the apex tends to expand into the object until a major fracture occurs. The problem with the metal races is that they are homogeneous and offer little resistance to the propagation of minor cracks. It will be noted, however, that in the filament wound balls and races disclosed herein, the filament is disposed circumferentially about the ball or race. With the filament thus disposed, the propagation of a crack would be accompanied by the breaking of the windings of the filament. This breaking of the winding is highly unlikely, however, due to the high tensile strength of the filament 15. Thus, even though the filament wound bearings may be exposed to bullets and shrapnel, they can continue to perform their function for a substantial period of time until the damaged part can be replaced more conveniently.

The filament wound balls and races are much lighter than the metal bearings of the prior art. This can be accounted for by the fact that both the adhesive 30 and the filament 15 have a lower density than the metals of which the prior art bearings are typically constructed.

The discussion above has proceeded on the basis of producing bearing balls or races having a spherical configuration at their outer periphery. It will be appreciated, however, that the balls or races may have any other suitable configuration without departing from the scope of the invention.

Although the inventive concept disclosed herein has been discussed with relationship to particular embodiments, it will be noted that the concept can be embodied in other forms that will be apparent to those of ordinary skill in the art. For this reason the inventive concept should be limited only by the scope of the following claims.

I claim:

1. A bearing member fixed to the surface of a support member movable relative to a second member, comprising:
   a filament formed from a continuous winding of a particular material and wound upon the support member in a particular configuration wherein initial portions of the filament define a first surface and ultimate portions of the filament define a second surface removed from the first surface; and
   an adhesive having properties of being cured and provided on the winding of the filament for retaining the filament in the wound configuration and for increasing the structural rigidity of the continuous filament after being cured.

2. The bearing member as set forth in claim 1 wherein the filament constitutes a fabric thread.

3. The bearing member as recited in claim 1 wherein the filament includes boron and the adhesive includes aluminum.

4. The bearing member as set forth in claim 1 wherein the adhesive includes a thermosetting adhesive having properties for being hardened at a particular temperature and for being cured at a temperature greater than the particular temperature.

5. The bearing member as set forth in claim 1, including means for supporting the bearing member for rotation relative to the second member.

6. The bearing member as recited in claim 1 further comprising:
   bearing metal coated on the exterior surface of the bearing member to improve the wear characteristics of the bearing member.

7. The bearing member as set forth in claim 1 further comprising:
   particles of a low friction material interspersed in the continuous filament near the exterior surface of the filament.

8. A bearing ball fixed to a movable member and movably mounted with respect to a bearing race, comprising:
   a filament formed from a continuous winding of a particular material and wound upon the movable member in a particular configuration wherein initial portions of the filament define an interior surface of the ball and ultimate portions of the filament define an exterior surface of the ball; and
   an adhesive having properties of being cured and provided on the winding of the filament for retaining the filament in the wound configuration and for increasing the structural rigidity of the continuous filament after being cured.

9. The bearing ball set forth in claim 8 wherein the filament constitutes a fabric thread.

10. The bearing ball recited in claim 8 wherein the filament includes boron and the adhesive includes aluminum.

11. The bearing ball set forth in claim 8 wherein the adhesive includes a thermosetting adhesive having properties for being hardened at a particular temperature and for being cured at a temperature greater than the particular temperature.

12. The bearing ball as recited in claim 8 further comprising:
   a bearing metal coated on the exterior surface of the wound filament to improve the wear characteristics of the bearing ball.

13. A bearing race for receiving a self-aligning bearing fixed to a movable member, comprising:
   a filament formed from a continuous thread of a particular material and wound to form the bearing race wherein initial portions of the filament define an exposed surface of the race and ultimate portions of the filament define a surface removed from the exposed surface of the race; and
   an adhesive having properties of setting after being cured and provided on the filament winding to retain the filament winding in the configuration of the bearing race and improve the structural rigidity of the race after being cured.

14. The bearing race as recited in claim 13 further comprising:
   first means included with the adhesive in at least the initial portions of the wound filament for imparting a low coefficient of friction to the exposed surface of the race; whereby
   the exposed surface of the race has properties including a relatively low coefficient of friction.

15. The bearing race set forth in claim 14 wherein the low friction means comprises 20 percent to 35 percent of the weight of the adhesive applied to the initial portions of the wound filament.

16. In combination for supporting a first member rotatable with respect to a second member;
   a first filament formed from a continuous thread of a particular material and wound in a configuration providing an interior surface contiguous with the first member and an exposed surface opposite to the interior surface;
   a first adhesive having properties of being cured and provided on the winding of the filament for retaining the filament in the wound configuration and for increasing the structural rigidity of the first filament after being cured;
   a second filament formed from a continuous thread of a particular material and wound in a configuration providing an exposed surface for slidingly engaging the exposed surface of the first filament and providing a second surface opposite the exposed surface and contiguous with the second member; and
   a second adhesive having properties of being cured and provided on the winding of the filament for retaining the filament in the wound configuration and for increasing the structural rigidity of the second filament after being cured.

17. The combination set forth in claim 16 wherein the first adhesive is curable at a first temperature and the second adhesive is curable at a second temperature lower than the first temperature.

* * * * *